United States Patent
Cejudo et al.

(10) Patent No.: US 12,056,145 B2
(45) Date of Patent: Aug. 6, 2024

(54) ON-DEMAND DATA FROM HETEROGENEOUS SOURCES

(71) Applicant: Blue Light LLC, Fayetteville, NC (US)

(72) Inventors: Marcos Cejudo, Sanford, NC (US); Robert Nowrot, Colorado Springs, CO (US)

(73) Assignee: BLUE LIGHT LLC, Fayetteville, NC (US)

( * ) Notice: Subject to any disclaimer, the term of this patent is extended or adjusted under 35 U.S.C. 154(b) by 0 days.

(21) Appl. No.: 18/189,912

(22) Filed: Mar. 24, 2023

(65) Prior Publication Data

US 2023/0237063 A1    Jul. 27, 2023

Related U.S. Application Data

(63) Continuation-in-part of application No. 17/228,776, filed on Apr. 13, 2021, now Pat. No. 11,636,106.

(60) Provisional application No. 63/039,201, filed on Jun. 15, 2020.

(51) Int. Cl.
*G06F 16/25* (2019.01)
*G06F 16/248* (2019.01)

(52) U.S. Cl.
CPC .......... *G06F 16/254* (2019.01); *G06F 16/248* (2019.01)

(58) Field of Classification Search
CPC .... G06F 16/254; G06F 16/248; G06F 16/256; G06F 7/14
See application file for complete search history.

(56) References Cited

U.S. PATENT DOCUMENTS

| | | | |
|---|---|---|---|
| 6,233,586 B1 | 5/2001 | Chang et al. | |
| 6,282,537 B1* | 8/2001 | Madnick | G06F 16/2471 |
| | | | 707/763 |
| 8,214,394 B2 | 7/2012 | Krishnaprasad et al. | |
| 9,275,121 B2 | 3/2016 | Ah-Soon et al. | |
| 10,545,982 B1 | 1/2020 | Kramer et al. | |
| 10,783,162 B1 | 9/2020 | Montague et al. | |
| 2012/0059840 A1* | 3/2012 | Reddy | G06F 16/256 |
| | | | 707/763 |
| 2012/0102022 A1 | 4/2012 | Miranker et al. | |
| 2019/0138640 A1 | 5/2019 | Pal et al. | |

OTHER PUBLICATIONS

Philpott, Dr. Matthew; Combined Search and Examination Report under sections 17 and 18(3) for foreign application GB2204578.5; Aug. 26, 2022; UKIPO.

* cited by examiner

*Primary Examiner* — Cam Y T Truong
(74) *Attorney, Agent, or Firm* — MP Patents, LLC

(57) ABSTRACT

A method enables on-demand delivery of data from a plurality of heterogeneous external data sources to a data analytics tool. With a mapping of one or more identified data connectors, a no-code client query, as formulated in a first data model, is dynamically translated to one or more external queries formulated in one or more alternate data models of the heterogeneous external data sources. With the mappings of the one or more identified connectors, each response to the one or more external queries is reformulated from the one or more alternate data models to the first data model to yield one or more client query results objects. The client query results objects are sent to the data analytics tool.

17 Claims, 10 Drawing Sheets

ON-DEMAND DATA FROM HETEROGENEOUS SOURCES

TECHNICAL FIELD

The present disclosure pertains to collection and discovery of information.

SUMMARY

The disclosure describes a method for on-demand delivery of data from a plurality of heterogeneous external data sources to a data analytics tool. The method includes a number of actions. A no-code client query received from the data analytics tool as formulated in a first data model is parsed to identify one or more data connectors to the heterogeneous external data sources. With a mapping of each of the one or more identified data connectors, the no-code client query as formulated in the first data model is dynamically translated to one or more external queries formulated in one or more alternate data models of the heterogeneous external data sources. From each of the heterogeneous external data sources, at least one response to the one or more external queries is received as formulated in the alternate data models, the at least one response representing a proper data subset of one or more of the heterogeneous external data sources. With the mappings of the one or more identified connectors, each of the at least one response to the one or more external queries is reformulated in real time from the one or more alternate data models to the first data model to yield one or more client query results objects. The one or more client query results objects are sent to the data analytics tool.

The disclosure also describes a system for on-demand delivery of data from a plurality of heterogeneous external data sources to a data analytics tool. The system includes a data warehouse and a database management system. The database management system is configured to parse a no-code client query received from the data analytics tool as formulated in a first data model to identify one or more data connectors to the heterogeneous external data sources and, with a mapping of each of the one or more identified data connectors, dynamically translate the no-code client query as formulated in the first data model to one or more external queries formulated in one or more alternate data models of the heterogeneous external data sources. The database management system is further configured to, from each of the heterogeneous external data sources, receive, as formulated in the alternate data models, at least one response to the one or more the external queries, the at least one response representing a proper data subset of one or more of the heterogeneous external data sources and, with the mappings of the one or more identified connectors and in real time, reformulate each of the at least one response to the external queries from the alternate data models to the first data model to yield one or more client query results objects. The database management system is also configured to send the client query results objects to the data analytics tool.

Further, the disclosure describes a computer program product comprising a non-transitory computer readable storage medium having program code embodied therewith, the program code being executable by a processor to perform the method for on-demand delivery of data from a plurality of heterogeneous external data sources to a data analytics tool.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the preferred mode of carrying out the present disclosure has been disclosed, those skilled in the art would recognize that other embodiments for carrying out or practicing objects of the disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known data aggregation methods using extract, load and transform approaches require time to process data and load/archive it into a repository copying data from one database that is already working to another fo analytics. Extract, load and transform approaches are complex to develop code and install and are not optimized for rapid connection to new databases or data sources acquired by the customer. Further, these known methods do not enable one-click federated searches of disparate data.

Disclosed methods, systems, data structures and computer-readable program code substantially eliminate, or at least partially address, problems in the prior art, enabling data analysts to collect and discover new information with data access on demand. Analysts can access, ingest and analyze relationships and report on vast amounts of disparate data regardless of its location or data structure. Together, with the help of data analytics tools, analysts can focus less time manually gathering data, and more time examining it. The logical architecture and physical architecture disclosed allow for these functions to be available to smaller to mid-size investigative departments.

Disclosed methods, systems, data structures and computer-readable program code can accept data from a variety of external sources and make it available to users for analysis in a data analytics tool. Ingested data can be stored to provide to other data analytics tools or may be relayed in real time from external data sources via data connectors. Disclosed methods, systems, data structures and computer-readable program code also have the ability to structure immediate searches of connected databases, for immediate alerts when information relevant to an analyst's use case is entered and without having to query an additional repository.

Additional aspects, advantages, features and objects of the present disclosure will be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

Figure 1:
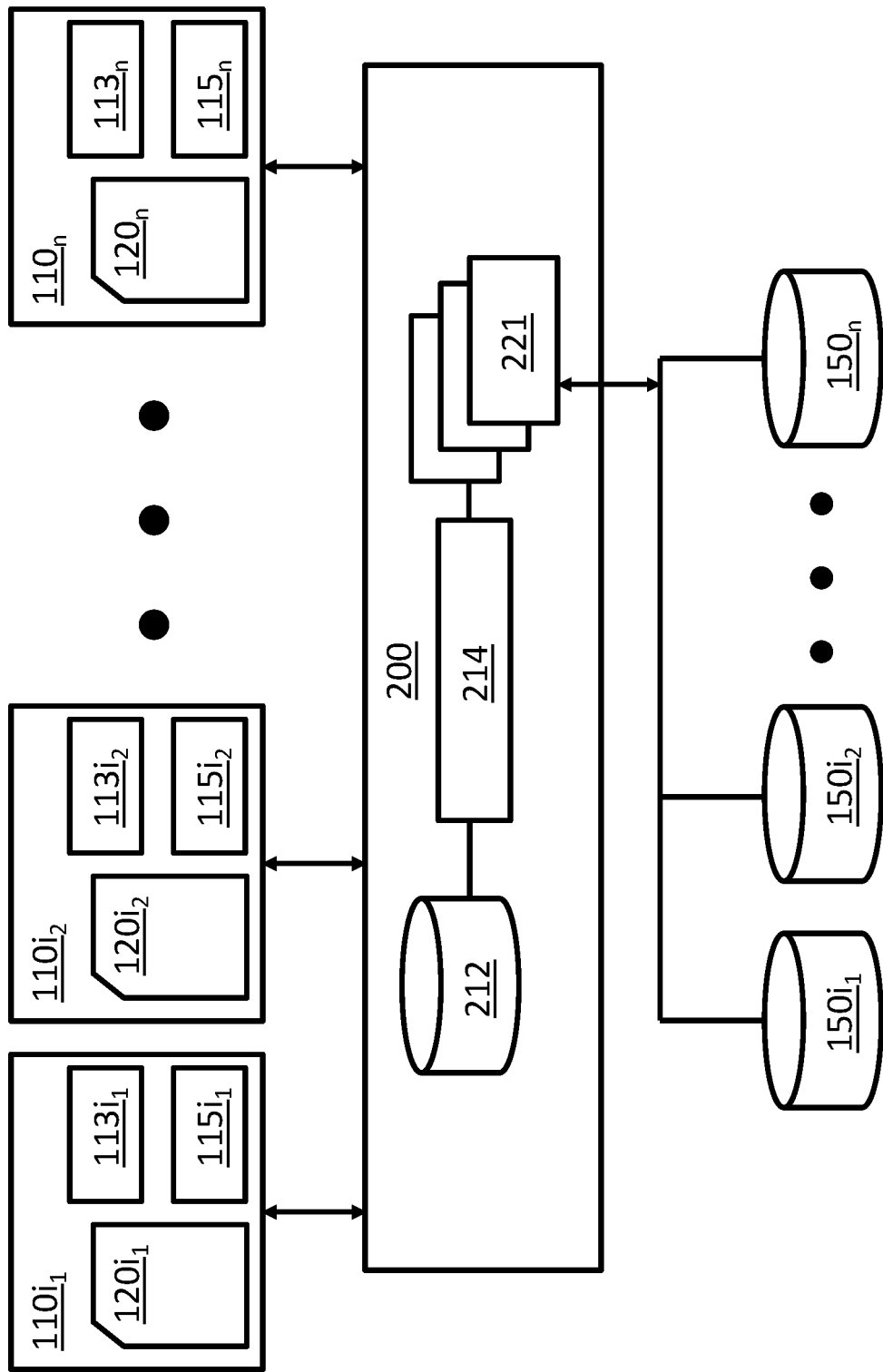
FIG. 1 schematically illustrates an example architecture suitable for practicing embodiments of the present disclosure.

Referring now to the drawings, particularly by their reference numbers, FIG. 1 schematically illustrates an example architecture or network environment suitable for practicing embodiments of the present disclosure including but not limited to methods for federated search of a plurality of heterogeneous external data sources from a data analytics tool. The network environment may include several data analytics or data visualization tools $110i_1$ through $110i_n$ and several external data sources $150i_1$ through $150i_n$ which may be structured to house data according to a variety of disparate data models.

Data analytics tools $110i_1$ through $110i_n$, which communicate with database management system 214, run analytics and/or visualization applications or modules $115i_1$ through $115i_n$ facilitating visualization and/or analysis of data. With support from applications or modules $115i_1$ through $115i_n$, analytics tools $110i_1$ through $110i_n$ handle data according to an internal data model and enable the user to display items or objects of the data to show relationships or links between entities. Data analytics tools $110i_1$ through $110i_n$ may offer geospatial and/or temporal views of objects and/or timeline, link and/or social network analysis to support insights not possible from the raw data. Data analytics tools $110i_1$ through $110i_n$ analyze and/or display objects and associated relations and/or properties in response to user input. For example, a user may execute a query based upon an entity name to display an icon representing entities of that name on a screen and may execute an "expand" operation on one of the displayed entities in order to see properties and/or links associated with that entity. Additionally or alternatively, upon the direction of the user, data analytics tools $110i_1$ through $110i_n$ may display an object summary page or card showing properties of an entity or link.

The network environment also includes a database system 200 including a database management system 214 and a repository or data warehouse 212 managed at least in part by database management system 214. Database management system 214 may further include a number of applications designed to handle client requests within a framework of endpoints. Data warehouse 212 may be considered an internal database from the perspective of data analytics tools $110i_1$ through $110i_n$. A communication network communicatively couples components such as analytics tools $110i_1$ through $110i_n$, database system 200 and external data sources $150i_1$ through $150i_n$ such that data analytics tools $110i_1$ through $110i_n$ may be clients of database system 200.

The network environment is suitable for implementing various methods for connecting data analytics tools with external data sources. In order to implement these methods, for example, database management system 214 provides a connecting service to data analytics tools $110i_1$ through $110i_n$, while data warehouse 212 stores data related to connector configurations, mappings to external data source data models, user settings, recurring data searches as well as objects representing vetted information from external data sources and/or internal sources. As part of the connecting service, database management system 214 may also providing collating, aggregating, merging, inserting and/or updating services.

Database system 200 may be implemented in various ways, depending on various possible scenarios. In one example scenario, database system 200 may be implemented by way of a spatially collocated arrangement of database management system 214 and data warehouse 212. In another example scenario, database system 200 may be implemented by way of a spatially distributed arrangement of database management system 214 and data warehouse 212 coupled mutually in communication via the communication network. In another example, database system 200 may be distributed across multiple computing devices such that database management system 214 is implemented on several computing devices and/or data warehouse 212 is implemented on several computing devices. In yet another example scenario, database management system 214 and data warehouse 212 may be implemented via one or more virtual machines running on computing device hardware. Database management system 214 and/or data warehouse 212 may be platform agnostic enabling deployment on any of a variety of operating systems.

The one or more data analytics tools $110i_1$ through $110i_n$ and one or more external data sources $150i_1$ through $150i_n$ are coupled in communication with database system 200 via the communication network. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, fourth generation (4G) telecommunication networks, fifth generation (5G) telecommunication networks and Worldwide Interoperability for Microwave Access (WiMAX) networks. In an example, communications between database system 200 and data analytics tools $110i_1$ through $110i_n$ is supported by a local area network while communications between database system 200 and external data sources $150i_1$ through $150i_n$ are supported by a wide area network and/or the internet through connectors 221 constructed from configurations stored in data warehouse 212.

Data analytics tools $110i_1$ through $110i_n$ may employ an instance of native-built application plugin $120i_1$ through $120i_n$. Plugins $120i_1$ through $120i_n$ may be applications and/or software products installed concurrently with the analytics and/or visualization applications or modules $115i_1$ through $115i_n$ and provide support for connecting data analytics tools $110i_1$ through $110i_n$ with external data sources $15011$ through $150i_n$ as well as additional functionality within the same application. Plugins $120i_1$ through $120i_n$ may be platform agnostic enabling deployment on any of a variety of operating systems. Data analytics tools $110i_1$ through $110i_n$ may also have one or more other applications or software products $113i_1$ through $113i_n$ stored as computer program code to a local program memory and configured to provide any of a variety of services to users of data analytics tools $110i_1$ through $110i_n$.

Example requirements for data analytics tools $110i_1$ through $110i_n$ include, for small to medium sized data analytics departments, 2 GHz x86-64 dual-core processor, OS Minimum of Windows 10 1809 Pro x86-64, 16 GB of RAM and 2 GHz x86-32, x86-64 processor which may be dual-core. Examples of the one or more data analytics tools $110i_1$ through $110i_n$ include, but are not limited to tablet computers, web pads, personal computers (PCs), handheld PCs, laptop computers and desktop computers.

In one embodiment, the service for federated search of a plurality of heterogeneous external data sources is arranged in a manner that its functionality is implemented partly in data analytics tools $110i_1$ through $110i_n$ and associated plugins $120i_1$ through $120i_n$ and partly in database system 200 and associated applications.

In an embodiment of the present disclosure, database management system 214 substantially continuously records and updates changes in the status of the data warehouse, while data analytics are being performed with the data analytics tools $110i_1$ through $110i_n$.

FIG. 1 is merely an example, which should not unduly limit the scope of the claims herein. It is to be understood that the specific designation for the network environment is provided as an example and is not to be construed as limiting the network environment to specific numbers, types, or arrangements of data analytics tools, database systems, external data sources and communication networks. A person of ordinary skill in the art will recognize many variations, alternatives, and modifications of embodiments of the present disclosure.

Figure 2:
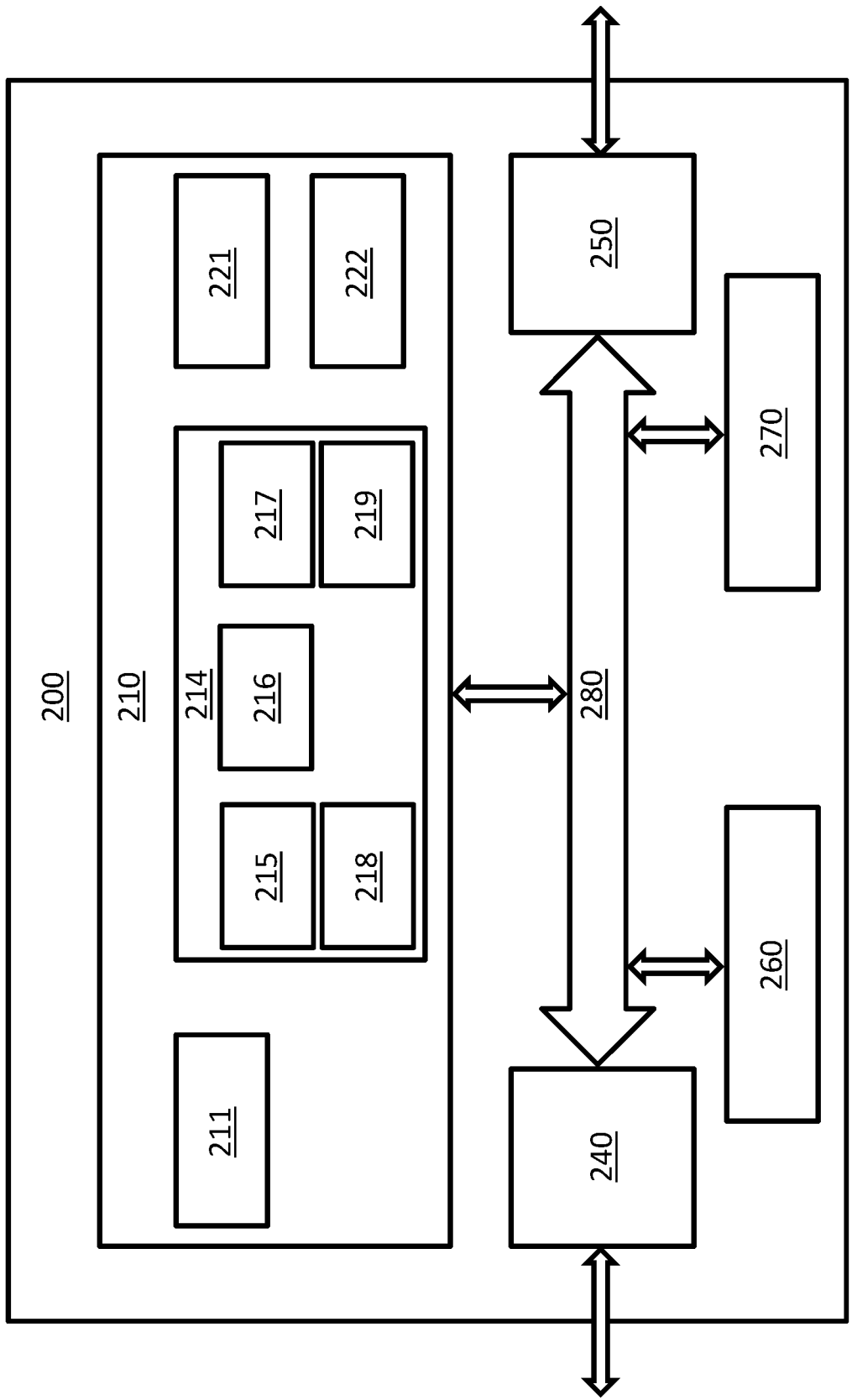
FIG. 2 schematically illustrates a detailed view of an example database system suitable for use in association with disclosed methods and systems.

FIG. 2 schematically illustrates a detailed view of an example database system 200 suitable for use in association with disclosed methods and systems. Database system 200 may be configured and/or arranged as a server provided to serve information to and/or handle requests from analytics tools $110i_1$ through $110i_n$. In an example, database system 200 is configured and/or arranged as a webserver capable of asynchronous execution for handling of multiple concurrent client requests. In an example, database system 200 may be arranged in a scalable, non-blocking web server framework such as Tornado.

Database system 200 includes, but is not limited to, a data memory 210, a computing hardware such as a processor 260, Input/Output (I/O) devices 250, a network interface 240, a storage 270 and a system bus 280 that operatively couples various components including data memory 210, processor 260, I/O devices 250, network interface 240 and storage 270. I/O devices 250 may include a display screen for presenting graphical images to a user of database system 200.

Database system 200 also includes a power source for supplying electrical power to the various components of database system 200. The power source may, for example, include a rechargeable battery or a power supply configured to convert or transform alternating source electrical current to a type usable by database system 200, such as low-voltage direct current.

Data memory 210 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards. In an example, data memory includes 32 GB of RAM.

Data memory 210 stores an operating system 211 as well as a number of database management system applications or modules 214-219 and one or more other applications 222. Examples of operating system 211 include but are not limited to Windows Server 2012 Essentials Edition x86-64, Windows Server 2012 R2 Datacenter Edition x86-64, Windows Server 2012 R2 Essentials Edition x86-64, Windows Server 2012 R2 Standard Edition x86-64, Windows Server 2012 Standard Edition x86-64, Windows Server 2016 Datacenter Edition x86-64, Windows Server 2016 Essentials Edition x86-64 and Windows Server 2016 Standard Edition x86-64.

Database management system 214 and associated modules enable collating data, aggregating data, and merging by updating or inserting data in data warehouse 212 and/or storage 270 including from external sources $150i_1$ through $150i_n$ as well as providing information, services and connections to analytics tools $110i_1$ through $110i_n$. The stored applications or modules may, for example, be parts of a software product associated with the federated search service provided by database system 200. The modules 214-219 and 222 may be written in any of a variety of programming languages suitable for provided disclosed services. In an example, one of more of modules 214-219 is programmed in Python. Executing one or more of modules 214-219 on processor 260 results in connecting to external sources $150i_1$ through $150i_n$ as well as collating data, aggregating data, and merging data. In an example, modules 214-219 are configured to be platform agnostic enabling deployment on any of a variety of operating systems.

In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen.

Additionally or alternatively, I/O devices 250 may include a mouse or a joystick that is operable to receive inputs corresponding to clicking, pointing, and/or moving a pointer object on the graphical user interface. I/O devices 250 may also include a keyboard that is operable to receive inputs corresponding to pushing certain buttons on the keyboard. Additionally, I/O devices 250 may also include a microphone for receiving an audio input from the user, and a speaker for providing an audio output to the user.

Moreover, storage 270 is a non-transient data storage medium which is configured to store one or more databases including but not limited to data warehouse 212. Storage may be implemented as any of a variety of equipment having any of a variety of suitable capacities. In an example, storage 270 is provided with 3-5 TB of disk space. In a further example, data warehouse 212 provided to storage 270 starts off with 5 TB of pure text data, but users may choose to attach images and other documents during data ingestion. Depending on the number of files per user, the size requirement for storage 270 could increase exponentially. Applications 214, when executed on processor 260, are optionally coupled to storage 270, and are configured to substantially continuously record and update mappings and external data source returns in storage 270.

Data warehouse 212 may be a collaborative data warehouse for vetted information and may contain high valued records that analysts have created from the original source data and then curated. Data in data warehouse 212 can be retrieved for further analysis and additional support. Data warehouse 212 may be schemaless. In an example, data warehouse 212 is implemented with Mongo DB.

Furthermore, network interface 240 optionally allows database system 200 to receive client search call requests and external data source returns, for example, via the communication network.

Processor 260 may be implemented as any of a variety of processing units including but not limited to a 2 GHz x86-64 dual-core processor for small to medium sized data analytics departments having, for example, up to eight analysts.

The network environment and database system 200 support a method for federated search of a plurality of heterogeneous external data sources from a data analytics tool. For example, data memory 210 stores a database management system 214 which may encompass a number of submodules that may, for example, be part of a software product associated with the federated search service provided by database system 200. Executing the software product on processor 260 results collating data, aggregating data, and merging data.

Database system 200 is optionally implemented by way of at least one of: a tablet computer, a UMPC, a PC, a laptop computer, a desktop computer, or a large-sized touch screen with an embedded PC. FIG. 2 is merely an example, which should not unduly limit the scope of the claims herein. It is to be understood that the specific designation for database system 200 is provided as an example and is not to be construed as limiting database system 200 to specific numbers, types, or arrangements of modules and/or components of database system 200. A person skilled in the art will recognize many variations, alternatives, and modifications of embodiments of the disclosure.

Figure 3:
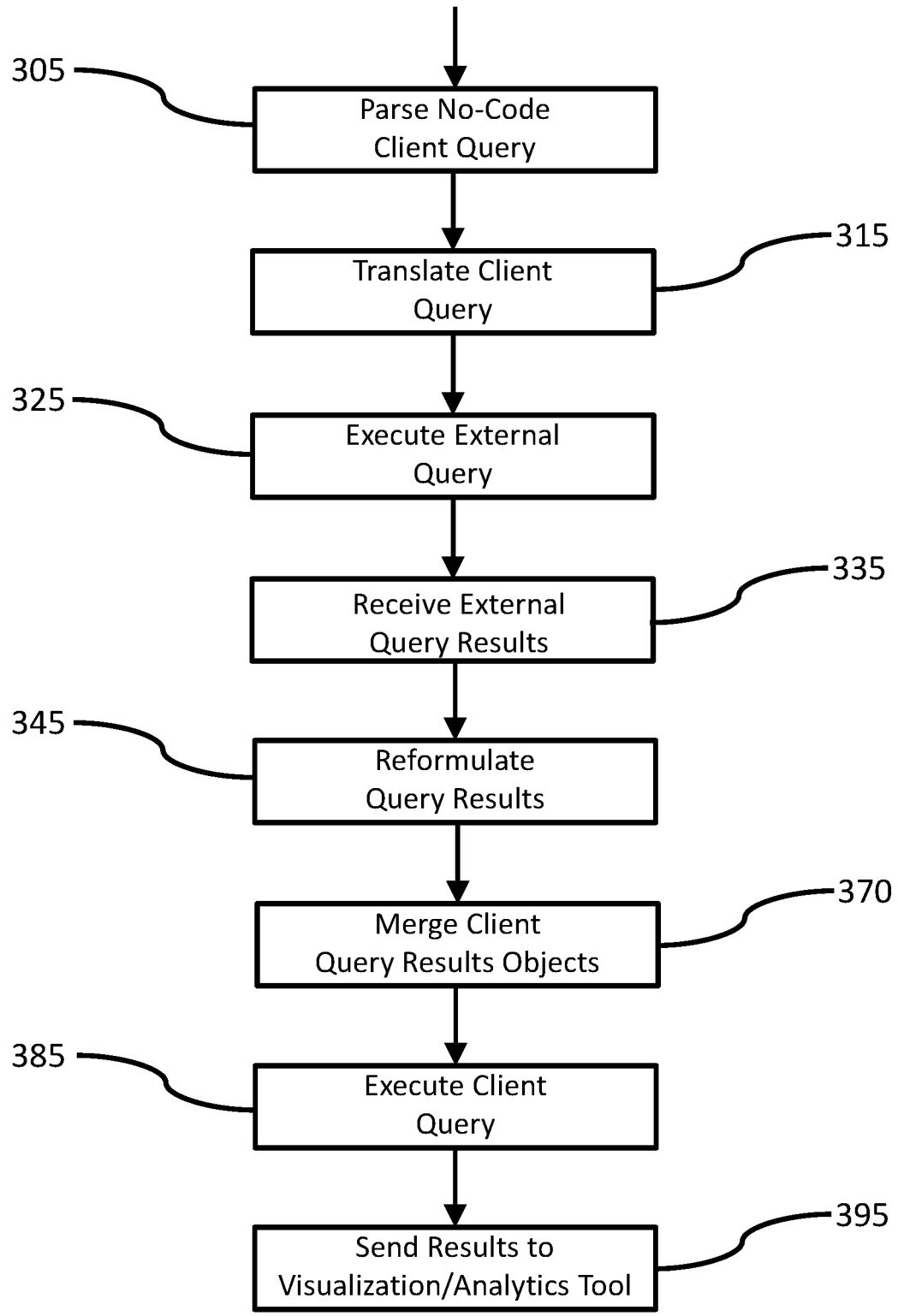
FIG. 3 illustrates an example method for federated search of a plurality of heterogeneous external data sources from a data analytics tool.

Based on the number of data sources or ad-hoc imports into database system 200, any query or "expand" request or client search call performed on the client side, for example by plug in to one of the data analytics tools $110i_1$ through $110i_n$ through plugin $120i_1$ through $120i_n$, is sent to database system 200 for requests processing. FIG. 3 illustrates an example method for federated search of a plurality of heterogeneous external data sources from a data analytics tool which may be performed by a computer system or components thereof including but not limited to database system 200 and/or database management system 214.

A client search call for retrieval of user-defined data from one or more external data sources $150i_1$ through $150i_n$ is received by database system 200 as formulated according to a first data model. In an example, the client search call may be received as a request with a reference to an entity or link item having one or more properties or attributes intended as filters for the search and a specification of one or more properties or attributes to be returned.

At 305, database management system 214 parses the user-provided data of the client search call in the form of a no-code client query received from data analytics tools $110i_1$ through $110i_n$ as formulated in a first data model to identify one or more data connector configurations suitable for creating connectors to heterogeneous external data sources $150i_1$ through $150i_n$. Data connectors 221 (FIGS. 1 & 2) provide two-way translation between a data analytics tool and external data sources. Requests from a data analytics tool will be translated into, for example, structured query language (SQL) queries or application programming interface (API) statements.

In addition to a query including one or more terms for item searching and/or filtering, the search call may specify one or more of the external data sources $150i_1$ through $150i_n$ to query. In an example, no external data source will be queried in the event that no external data source is specified in the search call. Based upon the external data sources to be queried, database management system 214 chooses connector configurations from which to construct connectors. Configurations may be stored in data warehouse 212 as one or more objects such as one or more JSON objects. In an example, a connecting module 215 of database management system 214 constructs connectors from the connector configurations and includes the appropriate mappings between data models. The one or more data connector configurations may be identified at one or more webserver endpoints of data warehouse 212, for example, by interfacing with data warehouse 212 in one or more representational state transfers.

The structure of connector configurations obtained from data warehouse 212 will vary depending on the data sources and the associated heterogeneous database management systems and disparate data models. Connectors have several configuration options that must be set for proper operation including the mapping configuration. Data connectors 221 are loaded dynamically as created by the database management system 214, and the configuration defines how database management system 214 creates a query. Configurable settings enable change of external data servers and credentials.

An example connector between a data analytics tool and an external data source includes a connector definition, an authentication definition and a mapping. The connector definition identifies connector type, connector name and connector library. Connector type defines the configuration as a data connector as opposed to other customizations supported by database system 200. A name provides a unique identifier for the data connector. A file includes the custom code library to load to run the connector. An authentication definition configures connection to the external data source server and includes an IP/hostname of the server, a network port that allows query calls on the database, a scheme identification such as http or https, a username of a user to perform queries and encrypted password used for queries.

An example connector takes the form:

```
{
"username": "username01",
"file": "mybluefsion.connector",
"name": "MyFirstConnector",
"database": "DatabaseName",
"dbType": "SQLServer",
"enabled": true,
"server": "SERVERNAME\\SQLServer",
"password": "MyEnncryptedDatabasePwd",
"type": "connector",
"mappingCfg": [
]
}
```

With a connector configuration chosen, a mapping configuration is selected based upon matching a typeName of the object referenced by the search call to the value of the typeName key of the mapping. A mapping constructed from the selected mapping configuration describes a translation between a data model of the data analytics tool and data models of the external data sources.

In an example, the configuration is created as a list of objects, correlating with entities and links from the data analytics tool data model using key-value pairs. Each object offers a mapping which defines the entity or link in relation to fields in the respective external data source, defines whether it is an entity or link with a type designator, defines a table or view in which the fields are located, has a unique ID to be used when defining links between entities, has a collection of dynamic properties assigned from data retrieved, has an optional collection of static properties statically assigned and has an optional collection of core properties that define an entity/link. In an example, the mapping objects are JSON objects.

An example mapping setting out entity type name, object type designator, a table or view in which the fields are located, and a unique ID to be used when defining links between entities takes the following form:

```
{
    "typeName": "Person",
    "type": "Entity"
    "table": "PersonView"
    "id": "ENT1
    "dynamic_properties": {
        ...
    }
    "static_properties": {
        ...
    },
    "core_properties": [
        ...
    ]
}
```

At 315, with a mapping of each of the one or more identified data connectors 221, database management system 214 translates the client search call or client query as formulated in the first data model to one or more external search calls formulated in one or more alternate data models of the heterogeneous external data sources. The format for each external data source may consist of individual queries in a native language and structure of the external data source.

Translation of the client query may be dynamic and the mapping data object may include one or more dynamic properties objects. The dynamic properties objects define what fields and filters are created for the data source queries and map each field in a table or view with a property of the entity/link. Each of the dynamic properties are set as a field to be retrieved and each one matching the queried property from the request is used in the filter.

An object type designator of the dynamic properties objects may identify whether the object to be mapped into the external data sources is an entity or a link. The dynamic properties objects may further include a designator indicating whether the field of the external data source describes a unique ID for the object.

The dynamic properties object defines the property type as defined in local data model, the name of the individual property as defined in the local data model and the name of the table/view being queried. The one or more dynamic properties objects may further include a type definition for the property of the data model object, a name definition for the property of the data model object and a name of the table or view of the external data source being queried.

The dynamic properties objects may be configured as key-value pairs having a field as the key and the property of the schema object as the value. Example dynamic properties objects setting out property type definition, name definition for the property and table/view name take the following form:

```
"SSN": {
    "isId": true
    "type":"SINGLE_LINE "
    "name": "Identification.Identification ID"
    "table": "MasterNameTable"
},
"DOB": {
    "isId": false,
    "type": "SINGLE_LINE ",
    "name": "Date of Birth",
    "table": "MasterNameTable"
},
"Alias": {
    "isId": false,
    "type": "SINGLE_LINE ",
    "name": "Identification.Other Name",
    "table": "MasterAliasTable"
}
```

The mapping data object may further include one or more static properties objects. Static properties objects are not used in queries but are added to each entity/link created from that mapping. Static properties objects may be used to define a specific type of entity being created, for example, separating different types of identification. They will typically be defined in the same way as dynamic properties, with two exceptions. Since no table or view is being used, neither is defined. Further, there is no direct field from the data source and the static value to use is used as the key.

The one or more static properties objects may include a specific entity type definition having a property name, a property type and a designator indicating whether the field describes a unique ID for the specific entity type definition.

An example static properties object setting out the property name and property type and indicating whether the field describes a unique ID as key-value pairs takes the form:

```
"static_properties": {
    "Social Security Number": {
        "name": "Identification Type",
        "type": "SUGGESTED ",
        "isId": false
    }
}
```

The mapping data object may further include one or more core properties objects. Core properties support creating objects from search results. Each core properties object represents a field required for an object to be created. These objects are defined by whether the field is used to generate a unique ID for the entity/link, the property type as defined in the local data model, the name of the individual property as defined in the local data model, the name of the table/view being queried and the data source field name.

The one or more core properties objects may further include a specific property definition having a property name, a property type, a table/view name, a field name of the table/view and a designator indicating whether the field describes a unique ID for the specific entity type definition.

An example core properties object setting out the property name, property type, table/view name, field name of the table/view and indicating whether the field describes a unique ID as key-value pairs takes the form:

```
"core_properties": [
    {
        "name": "First Name",
```

```
            "type": "SINGLE_LINE ",
            "isId": true,
            "table": "MasterNameTable",
            "external_name": "firstName"
        },
        {
            "name": "Last Name",
            "type": "SINGLE_LINE ",
            "isId": true,
            "table": "MasterNameTable",
            "external_name": "lastName"
        },
        {
            "name": "Identification.Identification ID",
            "type": "SINGLE_LINE ",
            "isId": true,
            "table": "MasterNameTable",
            "external_name": "SSN"
        }
    ]
```

Links also include information on which two entities are being connected. The "from" and "to" entities are defined using the ID set in the entity mapping. An example link mapping object setting out link type name, object type designator, and unique IDs of the entities being linked takes the form:

```
{
    "typeName": "Related To",
    "toEntity": "ENT1",
    "fromEntity": "ENT5",
    "type": "Link",
    "dynamic_properties": {
        ...
    }
}
```

The external search calls or external queries are executed by database management system 214 at 325 on the heterogeneous external databases as formulated in the alternate data models and according to the previously identified connectors. Using secure open database connectivity (ODBC) technology, web requests are made to available SQL server instances in the form of SQL queries. Using API connectors, a secure HTTP requests framework is leveraged to push queries to available data source API endpoints. For example, the external search calls or queries are executed by connecting to a server of the external databases identified by the connectors according to the hypertext transfer protocol type defined by the connector and a port identified in the connector and sharing a username and password for the server of the external databases as defined by the connectors. These requests are forwarded to $150i_1$ through $150i_n$ which generate the appropriate queries. Connector configurations and or connectors 221 may be platform agnostic enabling deployment on any of a variety of operating systems.

From each of heterogeneous external data sources $150i_1$ through $150i_n$, database management system 214 receives, as formulated in the alternate data models, at least one response to the one or more the external search calls at 335. Some external data sources $150i_1$ through $150i_n$ may return null responses which have no data.

Results of web requests are individually parsed to yield returned data. Data returned from each external data sources $150i_1$ through $150i_n$ represents less than the entire data set available from each source as a proper subset of the available data. As such, data may be ingested in real time without the need for large scale migration from external data sources $150i_1$ through $150i_n$.

At 345, each of the responses to the one or more external search calls or queries is reformulated by database management system 214 from the one or more alternate data models to the first data model to yield returned data, for example, as one or more client search result objects or client query results objects. The responses may be reformulated in real time. When results are returned, for each field in each result, the mappings are searched to find a match between the field and a dynamic property key of one or more of the mappings. If a match is found, an object of the type defined in the mapping is created. The object is then populated with the remaining data from fields returned in the external data source responses. A unique identifier is created for each object by creating a hash of all fields defined as "isId." In an example, connecting module 215 reformulates the external data source responses in accordance with the mappings. Responses to the one or more external search calls or queries may, for example, be reformulated into a common Entity, Link, Properties (ELP) format.

Reformulated external data source responses, which may now be considered client search results objects or client query results objects, are held in a merge queue of data warehouse 212. Database management system 214 merges the client search result objects or client query results objects to data warehouse 212 at 370 by updating a previously stored object of the data warehouse when the client search result objects or client query results objects match the previously stored object and inserting the client search result objects or client query results objects when the client search result objects or client query results objects do not match any previously stored object of the data warehouse. In an example, merging module 216 of database management system 214 performs merging operations.

Figure 4:
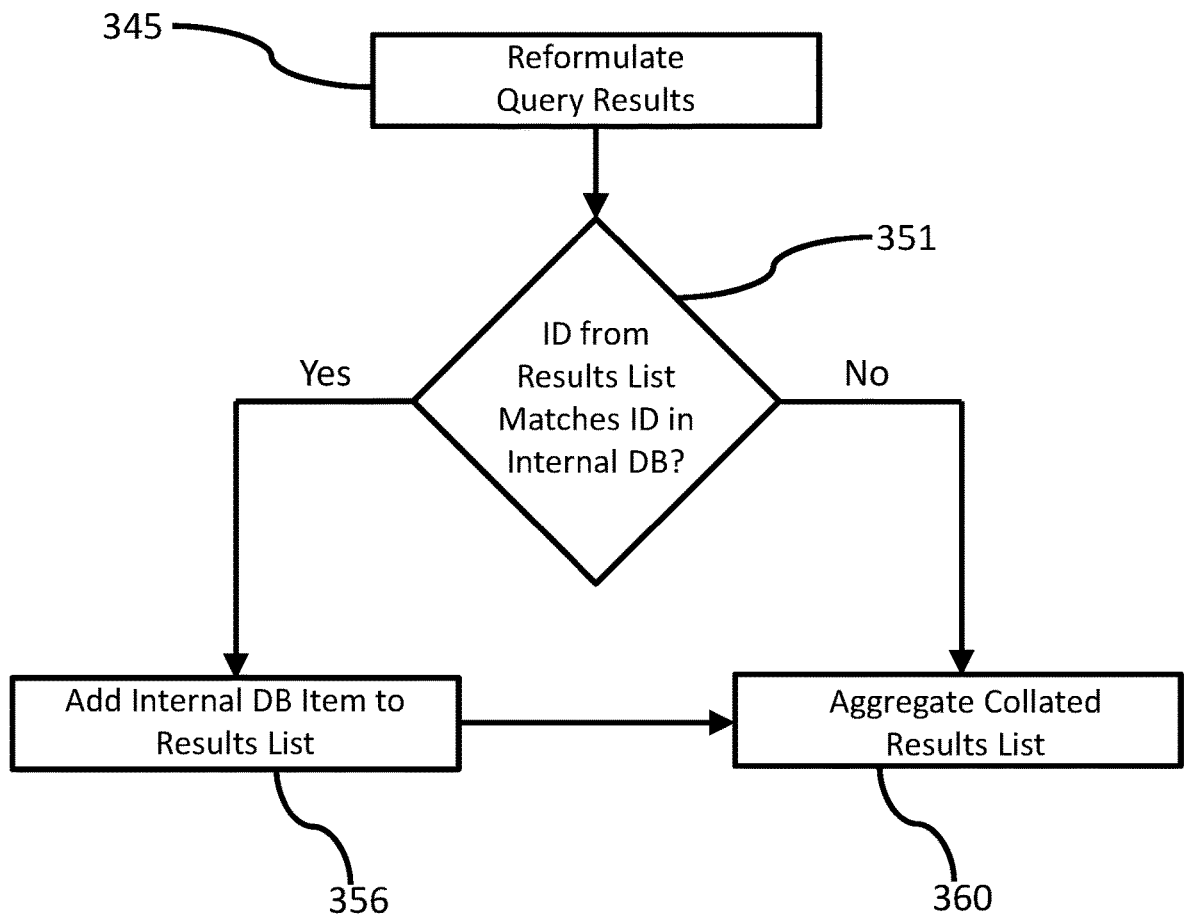
FIG. 4 illustrates an example method for collating results of external search calls.

First, client search results or client query results objects are collated by database management system 214, for example, with support from a collating module 217. Referring to FIG. 4, IDs of client search result objects or client query results objects are compared with IDs of objects previously stored to data warehouse 212 at 351 and any matching objects are added to a results list or merge queue also including client search results objects or client query results objects at 356. If no object previously stored to data warehouse 212 matches a given client search result object or client query results objects ID, the search results list is sent for aggregating.

Figure 5:
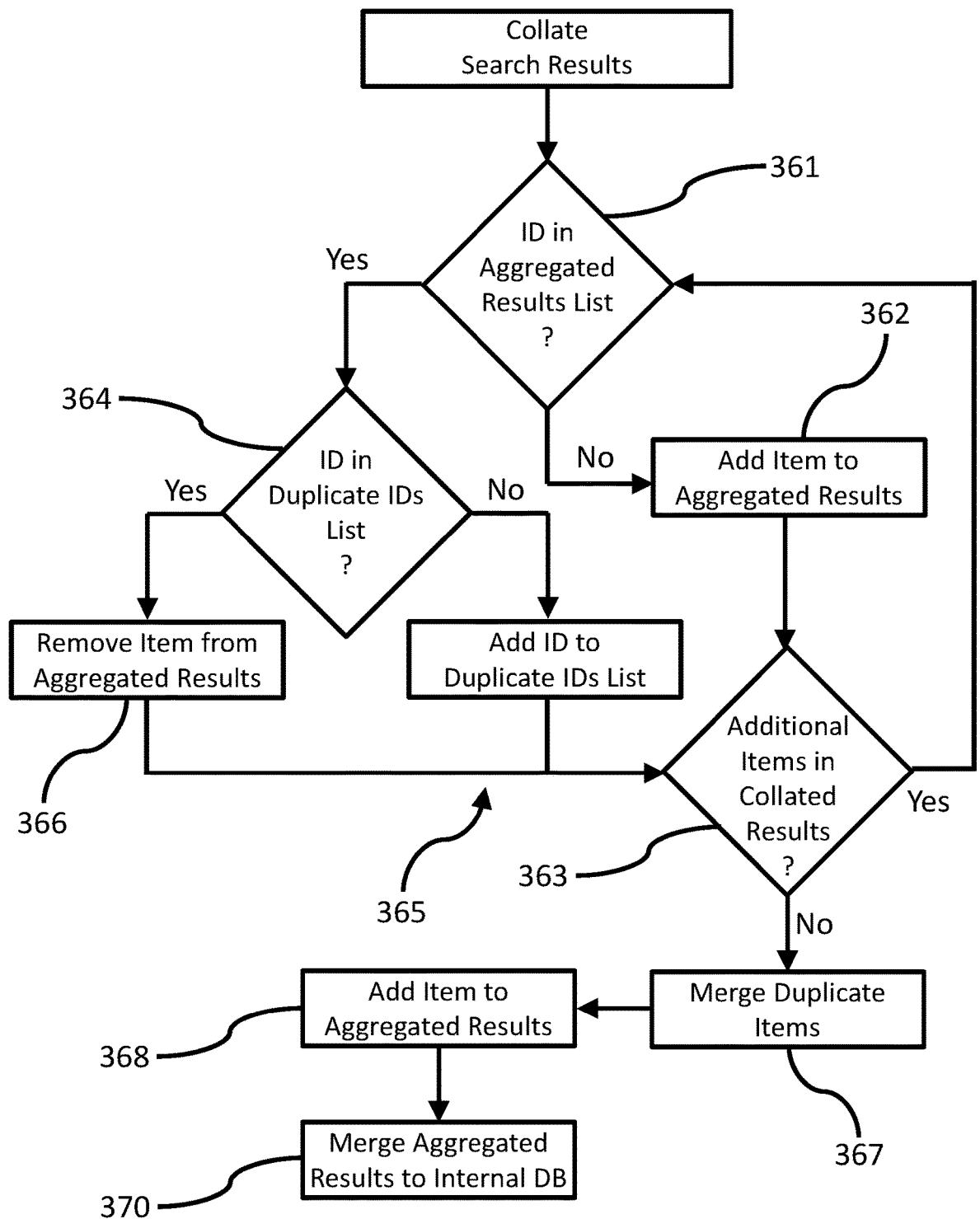
FIG. 5 illustrates an example method for aggregating collated results of external search calls.

Next, the results list of collated client search results or client query results objects and previously stored data warehouse objects are aggregated at 360 by database management system 214, for example, with support from an aggregating module 218. Referring to FIG. 5, the ID of each object in the collated results list is considered at 361. If the ID has not been previously added to an ID's list, the object having that ID is added to the aggregated results list (which must start empty) at 362. If it is determined at 363 that there are additional objects in the collated results list, the next ID is considered at 361. If the ID has been added to the IDs list, but determined, at 364, to not be in a duplicate IDs list, the ID is added to the duplicate IDs list at 365 and the object having the ID is removed from the aggregated results list. Otherwise, the ID is added to the duplicate IDs list at 366. If it is determined at 363 that there are no additional objects in the collated results list, objects identified by the duplicate IDs list which have matching IDs are merged at 367. Objects merged are then added into the aggregated results list at 368.

Figure 6:
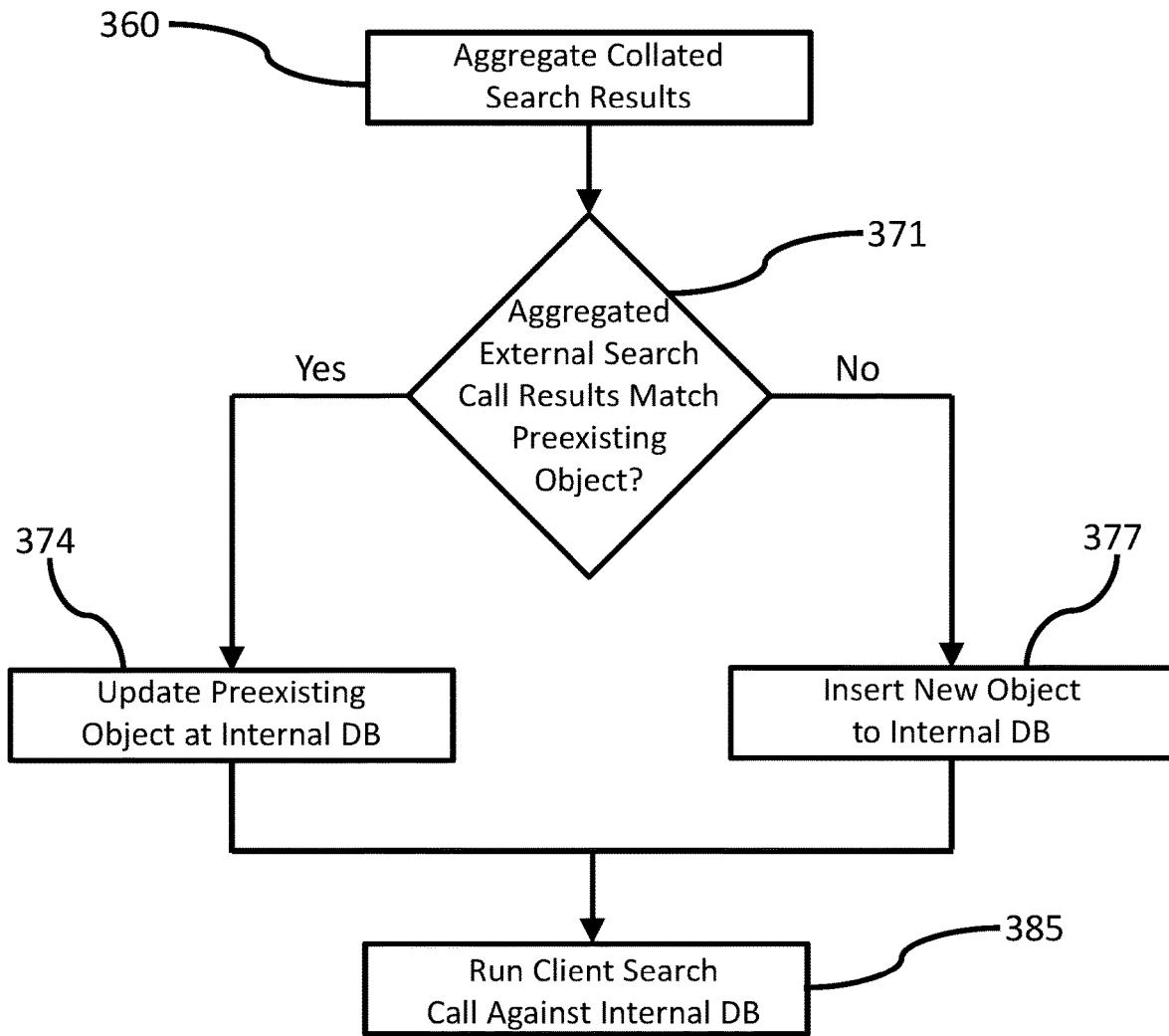
FIG. 6 illustrates an example method for merging results of external search calls.

The aggregated results list is then merged at 370 into data warehouse 212 with merging module 216 either by updating a previously stored object of the data warehouse or inserting the client search result objects or client query results objects. FIG. 6 illustrates an example method for merging reformulated results of external search calls or queries. Data warehouse 212 is searched for matching objects of the aggregated results list using IDs of each object in the aggregated results list. If it is determined, at 371, an ID matches an ID of an object in data warehouse 212, the object of data warehouse 212 is updated with any new data of the matching object from the aggregated results list at 374. If an ID does not match an ID if an object in data warehouse 212, the object from the aggregated results list is inserted to the data warehouse at 377.

When all of the external data source responses have been merged, at 385, database management system 214 executes the client search call or client query, as formulated in the first data model, against data warehouse 212 and, at 395, sends, to the analytics tool $110i_1$, for example, client search call results or client query results objects including the merged client search result objects or client query results objects. The results may include a single, consolidated result delivered to a portal of the data analytics tool. Plugin $120i_1$ may support delivery of client search call results or client query results objects to data analytics tool $110i_1$, for example, by communication with database system 200.

Figure 7:
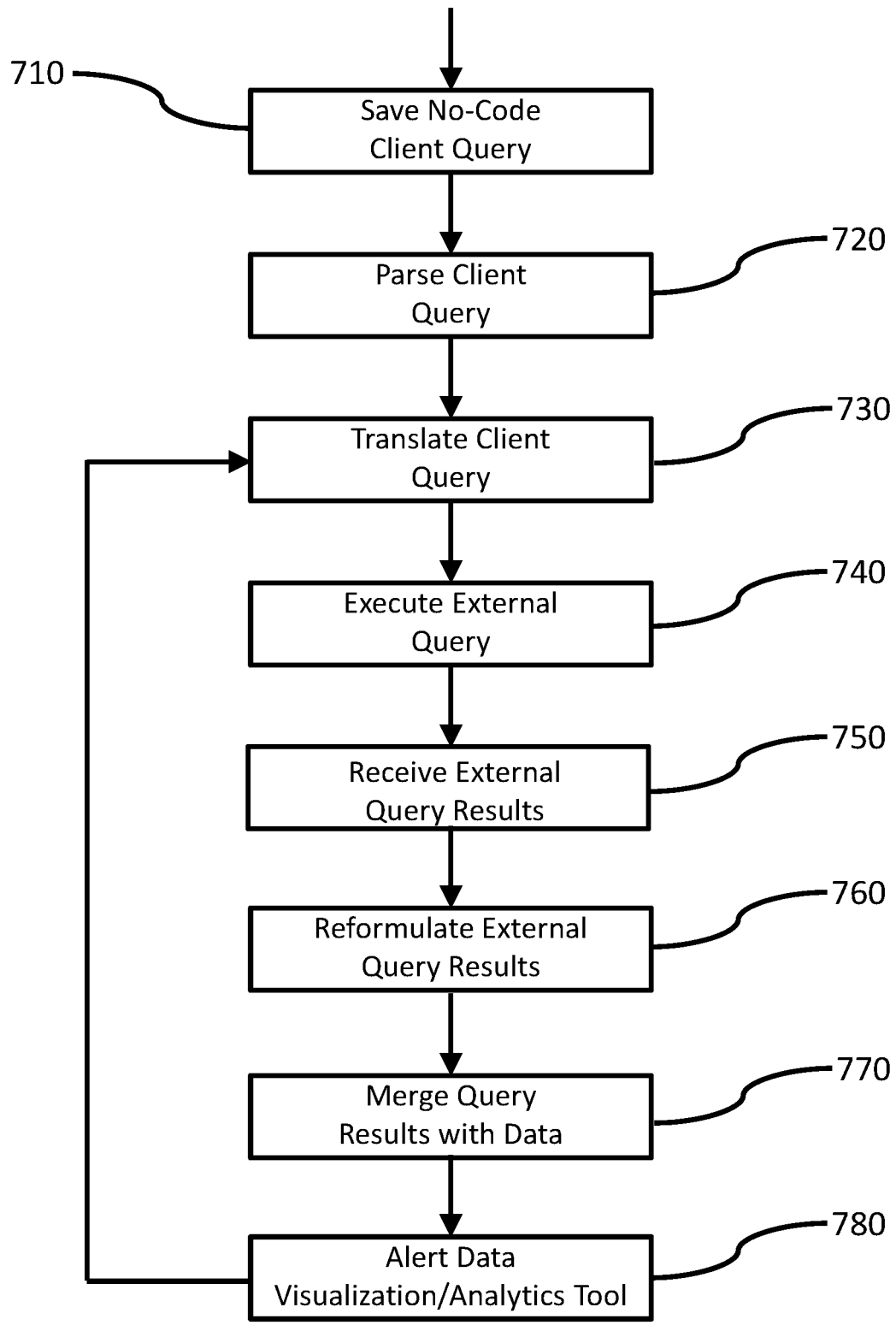
FIG. 7 illustrates an example method for sending an alert regarding updated results of client search calls.

Disclosed systems and methods further enable automated updates to data warehouse 212 based upon previous client search calls or queries. FIG. 7 illustrates an example method for alerting a data analytics tool client regarding updated results of client search calls or queries. After a client search call or query is received from one or the data analytics tool $110i_1$ through $110i_n$ as formulated in the first data model, the client search call or query is saved to data warehouse 212 at 710, for example, by a subscription module 219.

Periodically, the saved client search call or query is reparsed at 720 and retranslated at 730. The external search call or query resulting from the retranslation is executed at 740 and external data source responses are received at 750. The external data source responses are reformulated at 760 and then merged to data warehouse 212 at 770. At 780, an alert is sent by database management system 214, for example with support from subscription module 219, to one or more of data analytics tools $110i_1$ through $110i_n$ referring to any newly inserted or updated objects resulting from the periodically repeated parsing, translating, receiving, reformulating and merging. The alert may include any of a variety of immediate or scheduled prompts which may encourage the user's attention towards the newly inserted or updated objects including but not limited to notifications, messages, icons, audible alarms or combinations of these.

Figure 8:
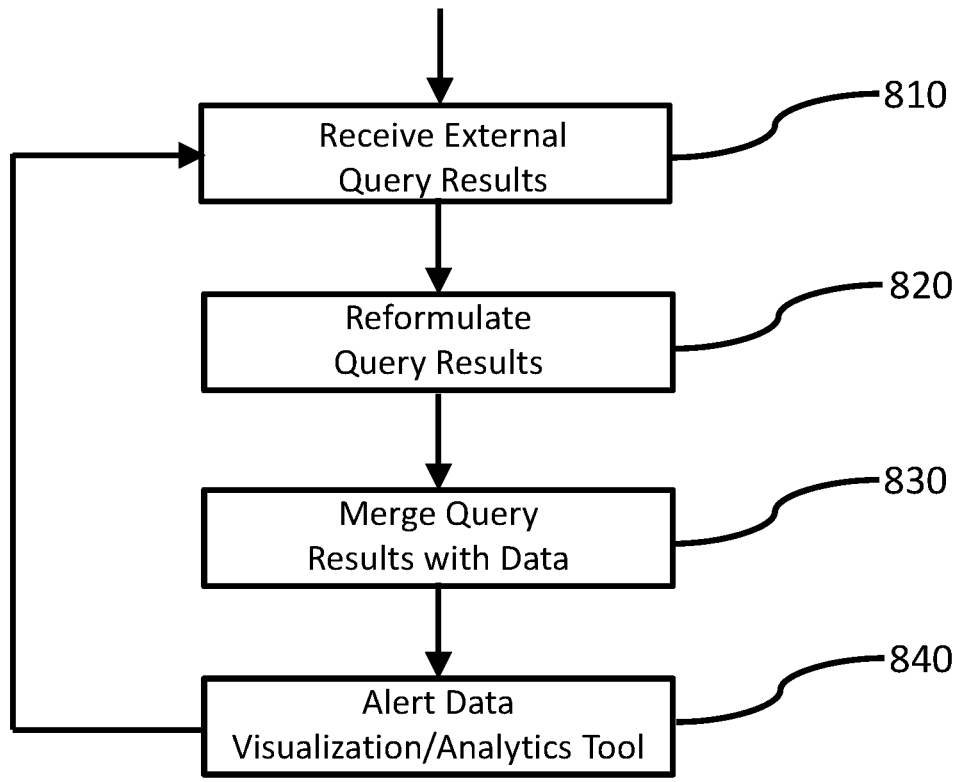
FIG. 8 illustrates an example method for sending an alert regarding supplemental results of client search calls.

FIG. 8 illustrates an example method for sending an alert regarding supplemental results of client search calls or queries. At 810, supplemental responses to the external search calls or queries are periodically received, for example by subscription module 219, from one or more of the heterogeneous external data sources $150i_1$ through $150i_n$ as formulated in the one or more alternate data models. With mappings identified based upon object type and fields of the responses to the external search calls or queries, the supplemental responses to the external search calls or queries are reformulated to yield one or more supplemental client search result objects or client query results objects formulated in the first data model at 820. The one or more supplemental client search result objects or client query results objects are merged to the data warehouse at 830 and, at 840, an alert is sent to one or more of the analytics tools $110i_1$ through $110i_n$ referring to any newly inserted or updated objects resulting from the periodic receipt and the translating the supplemental responses. Per the above, the alert may include any of a variety of immediate or scheduled prompts which may encourage the user's attention towards the newly inserted or updated objects.

Figure 9:
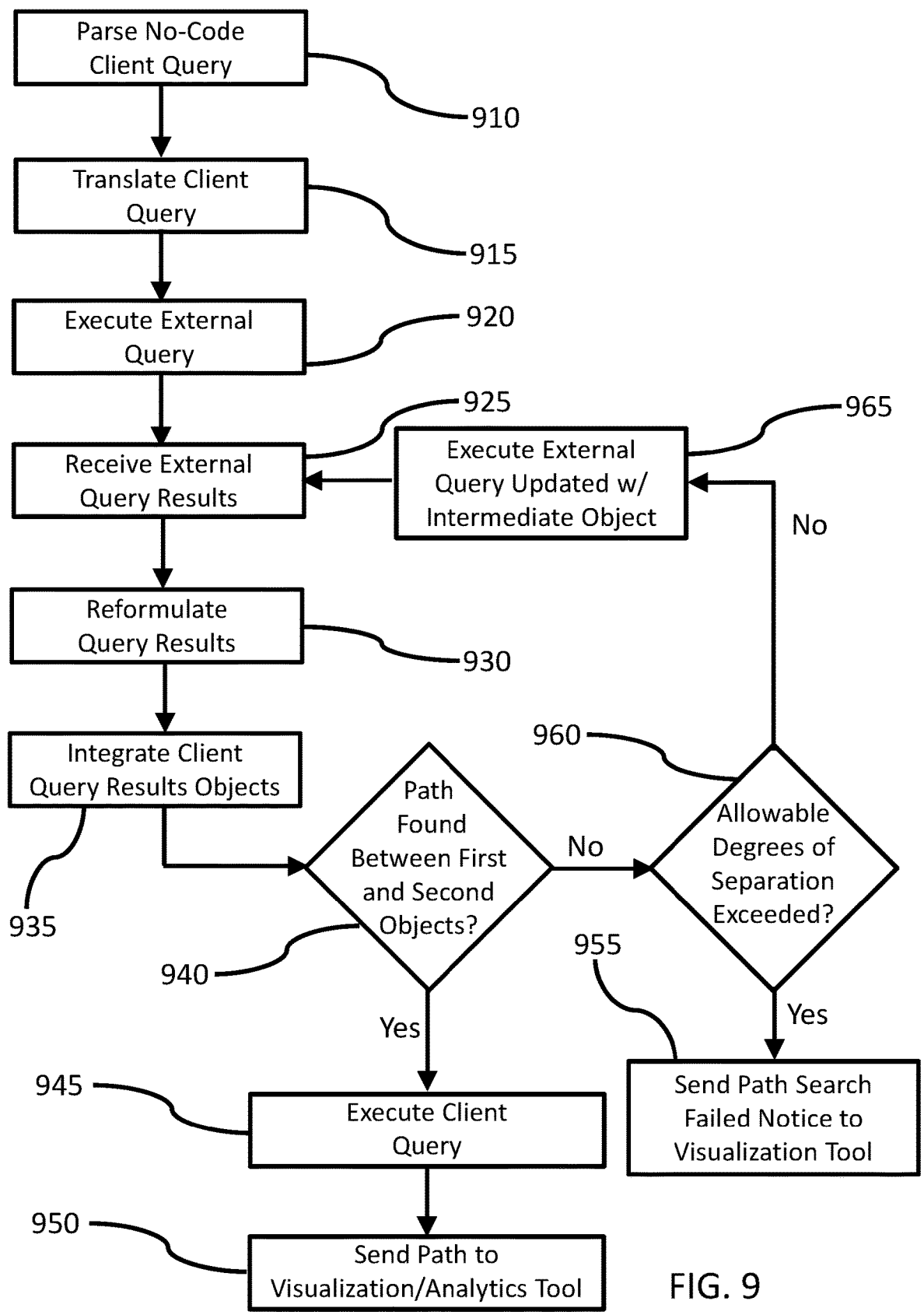
FIG. 9 illustrates another method for federated search of a plurality of heterogeneous external data sources from a data analytics tool.

FIG. 9 illustrates another method for federated search of a plurality of heterogeneous external data sources from a data analytics tool. The method described with reference to FIG. 9 enables determining whether a path exists between two entities through one or more other items or objects.

At 910, database management system 214 parses the client search call or query received from one of data analytics tools $110i_1$ through $110i_n$ as formulated in a first data model to identify one or more data connector configurations suitable for constructing connectors 221 to heterogeneous external data sources $150i_1$ through $150i_n$. The connectors will be constructed so as to include appropriate mappings per the above descriptions. While the client search call or query refers to first and second objects/entities the user hopes to associate through one or more objects actions may proceed in a manner similar to that described above with respect to FIG. 3.

Figure 10:
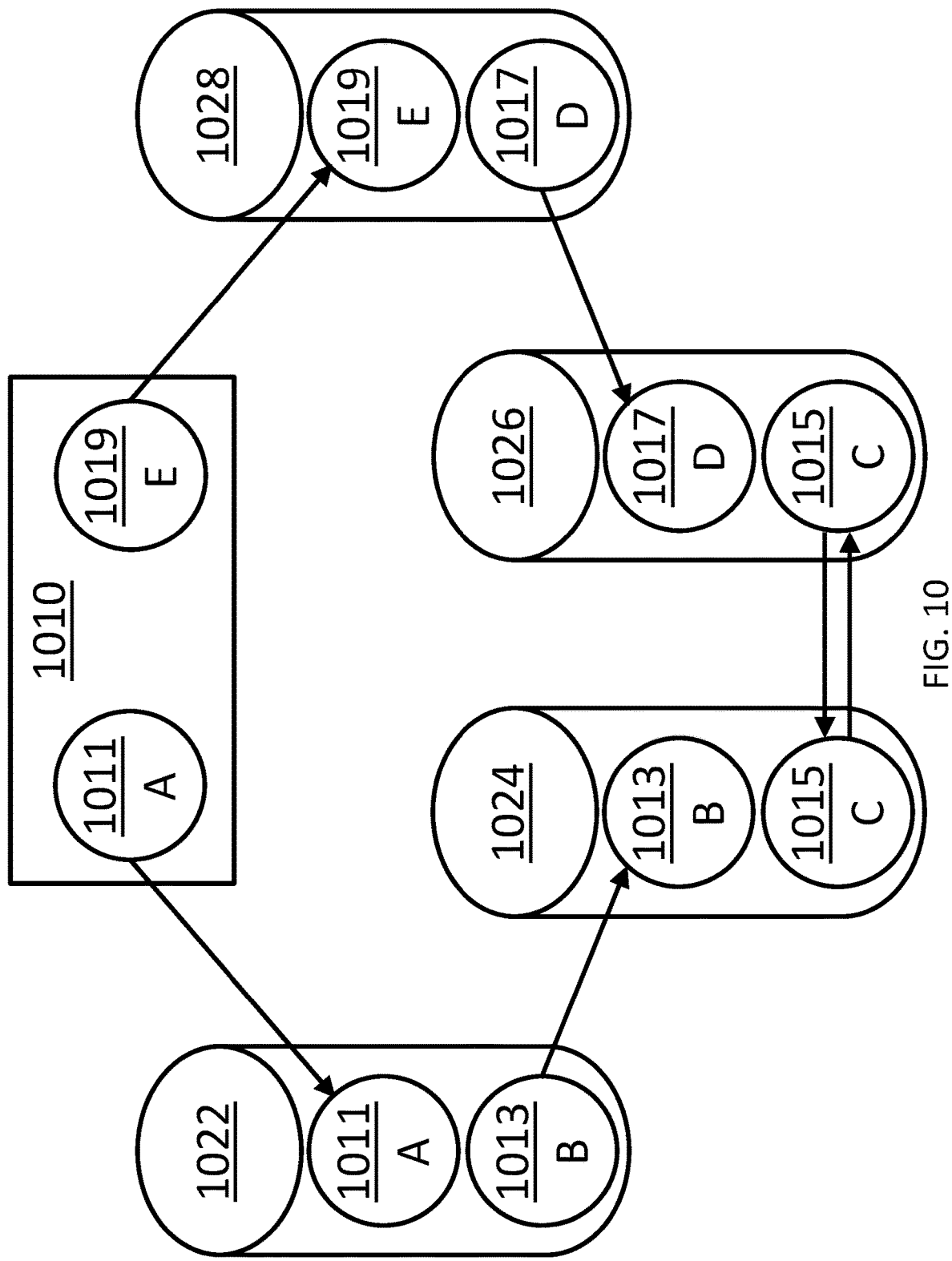
FIG. 10 schematically illustrates an example path between two entities.

Referring to FIG. 10 by way of example scenario in which the method of FIG. 9 may be employed, an entity A 1011 may be a first person having a first full name and an entity E 1019 may be a second person having a second full name and the query 1010 received from the client specifies the first full name and requests a link, if any, between entity A 1011 and entity E 1019.

At 915, with a mapping of each of the one or more data connectors 221, database management system 214 translates the client search call or query as formulated in the first data model to one or more external search calls or queries formulated in one or more alternate data models of heterogeneous external data sources. Again, the format for each external data source may consist of individual queries in a native language and structure of the external data source.

The external search calls or queries are executed by database management system 214 at 920 on the heterogeneous external databases as formulated in the alternate data models. The external search calls or queries are executed, for example, by connecting to a server of the external databases identified by the connectors according to the hypertext transfer protocol type defined by the connector and a port identified in the connector and sharing a username and password for the server of the external databases as defined by the connectors.

From each of heterogeneous external data sources $150i_1$ through $150i_n$, database management system 214 receives, as formulated in the alternate data models, a response to the one or more external search calls or queries at 925. In an example, referring to FIG. 10, a search of external data source 1022 returned a link between entity A 1011 and entity B 1013 and a search of external data source 1028 returned a link between entity E 1019 and entity D 1017.

At 930, with the mappings of the one or more identified connectors, each of the responses to the one or more external search calls or queries is reformulated from the one or more alternate data models to the first data model to yield returned data, for example, as one or more client search result objects or client query results objects.

Database management system 214 merges the client search result objects or client query results objects to a data warehouse 212 at 935. Referring to FIG. 10, entity B 1013 may be inserted to data warehouse 212 as a new object and entity A 1011 may be updated in data warehouse 212 to include an additional link (to entity B 1013). Similarly, entity B 1013 may be inserted to data warehouse 212 as a new object and entity E 1019 may be updated in data warehouse 212 to include an additional link (to entity D 1017).

When all of the client search result objects or client query results objects have been merged, at 940, database management system 214 determines whether a path was found between the first and second objects. If no path is found and the allowable degrees of separation between the two entities has not been exceeded at 960, database management system 214 will translate the returned objects into another set of external queries to search for one or more items linking the returned objects at 965.

Referring again, to the example scenario of FIG. 10, no direct link exists between Entity A 1011 and Entity E 1019 among the data sources as only data sources 1022 and 1028 returned any link to either of Entity A 1011 and Entity E 1019. Assuming the maximum number of allowable degrees of separation between Entity A 1011 and Entity E 1019 has not been met, database management system 214 will send out a new set of queries to the external data sources as formulated in the alternate data models with the search parameters being set to return links between newly discovered entities Entity B 1013 and Entity D 1017.

Again, database management system 214 receives, as formulated in the alternate data models, a response to the one or more the external search calls or queries at 925 and reformulates from the one or more alternate data models to the first data model to yield returned data, for example, as one or more client search result objects or client query results objects at 930.

Database management system 214 merges the client search result objects or client query results objects to data warehouse 212 at 935, for example, with support from a merging module 217. Referring to FIG. 10, entity C 1015 may be inserted to data warehouse 212 as a new object and entity B 1013 may now be updated in data warehouse 212 to include an additional link (to entity C 1015). Further, entity D 1017 may be updated in data warehouse 212 to include an additional link (to entity C 1015). Since entity C 1015 has just been inserted from data source 1024, it may be updated from data in data source 1026 or remain unchanged. Alternatively, entity C 1015 is inserted from data source 1026 and updated. In yet another alternative, entity C 1015 from data source 1024 may be aggregated before inserting to data warehouse 212.

When all external data source responses have been merged, at 940, database management system 214 again determines whether a path was found between the first and second objects. In the example of FIG. 10, a search of external data source 1024 returned a link between entity B 1013 and Entity C 1015 and a search of external data source 1026 returned a link between entity D 1017 and entity C 1015. Database management system 214 determines there is a path between Entity A 1011 and Entity E 1019 through entities 1013-1017 and data sources 1022, 1024, 1026 and 1028.

When a path is found between the two entities, at 945, the database management system 214 executes the client search call or query, as formulated in the first data model, against the data warehouse 238 and, at 950, sends, to the data analytics tool, client search call results or client query results objects reflecting a path linking the first object to be linked to the second object to be linked through one or more properties of the first object to be linked, the second object to be linked and the one or more client search result objects or client query results objects. For example, database management system 214 sends results reflecting a path between Entity A 1011 (FIG. 10) and Entity E 1019 through entities 1013-1017 which may, for example, be sent to a link analysis tool.

In another example not reflected by FIG. 10, if the allowable degrees of separation between two entities has been exceeded at 960 and no path has been found, database management system 214 sends a notification, at 955, to the data analytics tool that no link was found between the two queried entities.

The actions described above are only illustrative and other alternatives can also be provided where one or more actions are added, one or more actions are removed, or one or more actions are provided in a different sequence without departing from the scope of the claims herein.

Actions of methods described above with regard to FIGS. 3-9 may be performed by a processor, such as processor 260, in accordance with program code embodied with a non-transitory computer readable storage medium associated with a computer program product including one or more modules such as modules 215-219. As actions of the disclosed methods may be provided in different sequences, so the computer-executable code may be configured to provide a service having a different sequence of actions from those described above. In some examples, the code may be downloaded from a software application store, for example, from an "App store", to a data processing unit.

Embodiments of the present disclosure are susceptible to being used for various purposes, including, though not limited to, data analytical federated search with workgroup capable thin or thick client enabling users to focus less time manually gathering data, and more time examining it.

Data from disclosed external data sources can be accessed through disclosed data connectors, which use customized services to read data from an external data source in response to a user's search request. Data connectors translates the data, on demand, into an Entity, Link, and Property (ELP) form which can be viewed within a user dashboard and later sent to a data analytics tool.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for on-demand delivery of data from a plurality of heterogeneous external data sources to a data analytics tool, comprising:

parsing a no-code client query received from the data analytics tool as formulated in a first data model to identify one or more data connectors to the heterogeneous external data sources, wherein the one or more data connectors are loaded dynamically as created by a database management system;

saving, in a data warehouse, the no-code client query received from the data analytics tool as formulated in the first data model;

with a mapping of each identified data connector of the one or more identified data connectors, dynamically translating the no-code client query as formulated in the first data model to one or more external queries formulated in one or more alternate data models of the heterogeneous external data sources, wherein the mapping is constructed from a mapping configuration which describes a translation between the first data model of the data analytics tool and the one or more alternative data models of the heterogeneous external data sources;

from each heterogeneous external data source of the heterogeneous external data sources, receiving, as formulated in the alternate data models one or more responses to the one or more external queries, wherein the one or more responses represent a proper data subset of one or more of the heterogeneous external data sources;

with the mappings of the one or more identified connectors and in real time, reformulating each response of the one or more responses to the one or more external queries from the one or more alternate data models to the first data model to yield client query results objects;

periodically repeating the parsing, the translating, the receiving and the reformulating; and sending an alert to the data analytics tool referring to the client query results objects resulting from the periodically repeated parsing, translating, receiving, and reformulating.

2. The method as set forth in claim 1, further comprising:

periodically receiving from one or more of the heterogeneous external data sources, as formulated in the one or more alternate data models, supplemental responses to the external queries;

with the mappings, reformulating the supplemental responses to the external queries to one or more supplemental client query results objects in the first data model;

and sending an alert to the data analytics tool referring to any new client query results objects resulting from the periodic receipt and the reformulation of the supplemental responses.

3. The method as set forth in claim 1, wherein the one or more data connectors are identified using one or more representational state transfers.

4. The method as set forth in claim 1, further comprising executing the external queries on the heterogeneous external data sources as formulated in the alternate data models.

5. The method as set forth in claim 1, wherein:

the parsing the no-code client query further comprises parsing a no-code client query referring to first and second objects to be linked;

the translating the no-code client query further comprises translating each of the first and second objects to be linked; and the receiving the one or more responses to the one or more external queries from each heterogeneous external data source of the heterogeneous external data sources further comprises receiving the one or more responses for each of the first object to be linked and the second object to be linked; and reformulating further comprises reformulating the one or more responses for each of the first object to be linked and the second object to be linked to yield one or more client query results objects for each of the first object to be linked and the second object to be linked; and the method further includes: to the data analytics tool, sending client query results objects reflecting a path linking the first object to be linked to the second object to be linked through a third object linked to each of the first and second objects.

6. A system for on-demand delivery of data from a plurality of heterogeneous external data sources to a data analytics tool, comprising:

a processor;

a data warehouse; and a database management system configured to:

parse a no-code client query received from the data analytics tool as formulated in a first data model to identify one or more data connectors to the heterogeneous external data sources, wherein the one or more data connectors are loaded dynamically as created by the database management system;

save, in the data warehouse, the no-code client query received from the data analytics tool as formulated in the first data model;

with a mapping of each identified data connector of the one or more identified data connectors, dynamically translate the no-code client query as formulated in the first data model to one or more external queries formulated in one or more alternate data models of the heterogeneous external data sources, wherein the mapping is constructed from mapping a configuration which describes a translation between the first data model of the data analytics tool and the one or more alternative data models of the heterogeneous external data sources;

from each heterogeneous external data source of the heterogeneous external data sources, receive, as formulated in the alternate data models, one or more responses to the one or more the external queries, wherein the one or more responses represent a proper data subset of one or more of the heterogeneous external data sources;

with the mappings of the one or more identified connectors and in real time, reformulate each response of the one or more responses to the external queries from the one or more alternate data models to the first data model to yield client query results objects;

periodically repeat the parsing, the translating, the receiving and the reformulating; and send an alert to the data analytics tool referring to the client query results objects resulting from the periodically repeated parsing, translating, receiving, and reformulating.

7. The system as set forth in claim 6, wherein the database management system is further configured to:

periodically receive from one or more of the heterogeneous external data sources, as formulated in the one or more alternate data models, supplemental responses to the external queries;

with the mappings, reformulate the supplemental responses to the external queries to one or more supplemental client query results objects in the first data model;

and send an alert to the data analytics tool referring to any new client query results objects resulting from the periodic receipt and the reformulation of the supplemental responses.

8. The system as set forth in claim 6, wherein the one or more data connectors are identified using one or more representational state transfers.

9. The system as set forth in claim 6, wherein the database management system is further configured to execute the external queries on the heterogeneous external data sources as formulated in the alternate data models.

10. The system as set forth in claim 6, wherein the database management system is configured to execute asynchronously.

11. The system as set forth in claim 6, wherein the data warehouse is configured so as to be schemaless.

12. The system as set forth in claim 6, wherein the database management system is further configured to:
parse the no-code client query by parsing a no-code client query referring to first and second objects to be linked;
translate the no-code client query by translating each of the first and second objects to be linked;
receive the one or more responses to the one or more external queries from each heterogeneous external data source of the heterogeneous external data sources by receiving the one or more responses for each of the first object to be linked and the second object to be linked;
reformulate by reformulating the one or more responses for each of the first object to be linked and the second object to be linked to yield one or more client query results objects for each of the first object to be linked and the second object to be linked; and
to the data analytics tool, send client query results objects reflecting a path linking the first object to be linked to the second object to be linked through a third object linked to each of the first and second objects.

13. A computer program product comprising a non-transitory computer readable storage medium having program code embodied therewith, the program code being executable by a processor to perform a method for on-demand delivery of data from a plurality of heterogeneous external data sources to a data analytics tool and the method including:
parsing a no-code client query received from the data analytics tool as formulated in a first data model to identify one or more data connectors to the heterogeneous external data sources, wherein the one or more data connectors are loaded dynamically as created by a database management system;
saving, in a data warehouse, the no-code client query received from the data analytics tool as formulated in the first data model;
with a mapping of each identified data connector of the one or more identified data connectors, dynamically translating the no-code client query as formulated in the first data model to one or more external queries formulated in one or more alternate data models of the heterogeneous external data sources, wherein the mapping is constructed from a mapping configuration which describes a translation between the first data model of the data analytics tool and the one or more alternative data models of the heterogeneous external data sources;
from each heterogeneous external data source of the heterogeneous external data sources, receiving, as formulated in the alternate data models one or more responses to the one or more external queries, wherein the one or more responses represent a proper data subset of one or more of the heterogeneous external data sources;
with the mappings of the one or more identified connectors and in real time, reformulating each response of the one or more responses to the one or more external queries from the one or more alternate data models to the first data model to yield client query results objects;
periodically repeating the parsing, the translating, the receiving and the reformulating; and
sending an alert to the data analytics tool referring to the client query results objects resulting from the periodically repeated parsing, translating, receiving, and reformulating.

14. The computer program product as set forth in claim 13, wherein the program code is further executable by a processor to perform the method including:
periodically receiving from one or more of the heterogeneous external data sources, as formulated in the alternate data models, supplemental responses to the external queries;
with the mappings, reformulating the supplemental responses to the external queries to one or more supplemental client query results objects in the first data model;
and sending an alert to the data analytics tool referring to any new client query results objects resulting from the periodic receipt and the reformulation of the supplemental responses.

15. The computer program product as set forth in claim 13, wherein the one or more data connectors are identified using one or more representational state transfers.

16. The computer program product as set forth in claim 13, wherein the program code is further executable by the processor to perform the method including executing the external queries on the heterogeneous external data sources as formulated in the alternate data models.

17. The computer program product as set forth in claim 13, wherein the program code is further executable by a processor to perform the method including:
parsing the no-code client query by parsing a no-code client query referring to first and second objects to be linked; and
wherein the client query results objects reflect a path linking the first object to be linked to the second object to be linked through a third object linked to each of the first object and the second object.

* * * * *